(12) United States Patent
Kato

(10) Patent No.: US 8,745,880 B2
(45) Date of Patent: Jun. 10, 2014

(54) ROTARY CUTTER FOR MOWER

(75) Inventor: Hiroki Kato, Tokyo (JP)

(73) Assignee: Starting Industrial Co., Ltd. (JP)

( * ) Notice: Subject to any disclaimer, the term of this patent is extended or adjusted under 35 U.S.C. 154(b) by 130 days.

(21) Appl. No.: 13/516,904

(22) PCT Filed: Nov. 12, 2010

(86) PCT No.: PCT/JP2010/070218
§ 371 (c)(1),
(2), (4) Date: Jun. 18, 2012

(87) PCT Pub. No.: WO2011/077853
PCT Pub. Date: Jun. 30, 2011

(65) Prior Publication Data
US 2012/0255182 A1    Oct. 11, 2012

(30) Foreign Application Priority Data

Dec. 25, 2009 (JP) .................................. 2009-293686

(51) Int. Cl.
*B26B 7/00* (2006.01)
*A01D 34/416* (2006.01)

(52) U.S. Cl.
USPC ................................ 30/276; 30/347; 56/12.7

(58) Field of Classification Search
USPC ............. 30/276, 345, 347; 56/12.5, 12.7, 297
See application file for complete search history.

(56) References Cited

U.S. PATENT DOCUMENTS

| | | | | |
|---|---|---|---|---|
| 4,183,138 A | * | 1/1980 | Mitchell et al. ................. | 30/276 |
| 4,672,798 A | * | 6/1987 | Ota ................................ | 56/12.7 |
| 5,887,348 A | | 3/1999 | Iacona et al. | |
| 6,418,627 B1 | * | 7/2002 | Tsunoda et al. ................ | 30/347 |
| 6,952,877 B2 | | 10/2005 | Pfaltzgraff | |
| 8,266,805 B1 | * | 9/2012 | Alliss .............................. | 30/276 |
| 2002/0170183 A1 | * | 11/2002 | Sugihara et al. ................ | 30/276 |
| 2009/0223065 A1 | | 9/2009 | Proulx | |

FOREIGN PATENT DOCUMENTS

| | | |
|---|---|---|
| JP | 3-112218 | 11/1991 |
| JP | 10-98931 | 4/1998 |
| JP | 2005-124501 | 5/2005 |
| JP | 2007-209356 | 8/2007 |
| JP | 2009-136175 | 6/2009 |

\* cited by examiner

*Primary Examiner* — Ghassem Alie
(74) *Attorney, Agent, or Firm* — Gerald E. Hespos; Michael J. Porco; Matthew T. Hespos

(57) ABSTRACT

Provided is a rotary cutter for a mower that achieves easy and rapid cord insertion and improved work efficiency. A rotary cutter for a mower includes: a cord cutting grass or the like; a reel housing the cord, a case and a cover housing the reel therein; a pressing body rotating the reel; and a resilient element elastically supporting the case and the cover, and the rotary cutter is configured such that the reel axially moved by rotation of the pressing body so as to come into contact with the pressing body, and the cord is wound around the reel while being clamped in a clearance created between the reel due to the axial movement of the reel.

10 Claims, 4 Drawing Sheets

ROTARY CUTTER FOR MOWER

BACKGROUND OF THE INVENTION

1. Field of the Invention

The present invention relates to a rotary cutter for a mower used for mowing grass and the like with a cord (principally made of nylon) extending in a radial direction of a case which is rotationally-driven by power of a motor or the like by way of an axis of rotation, and in particular to a rotary cutter of a type in which winding a cord around a reel is performed without removing a case and a cover, wherein even if the cord wound around the reel is consumed and shortened due to wear of the cord, the cutting work can be continued by preventing the remaining cord wound around the reel from falling out of the reel.

2. Description of the Related Art

As this type of rotary cutter, it is conventionally known a rotary cutter having a reel which houses a nylon cord, wherein when the cord is worn away, the cord is let out from the reel by pressing the cutter on the ground during rotation, by tapping the cutter or by running up the rotation of the cutter. As to this type of rotary cutter, when the cord housed in the reel was worn out, it was common to take out the reel by disassembling the rotary cutter, and wind a new cord, and then rearranging its components again. However, by such a way, it is very troublesome and inconvenient to carry out such procedures during mowing. Moreover, when the rotary cutter is disassembled and the reel is taken out, it has been feared that these components may be lost since associated components of the reel and other components are taken out at the same time. On this account, as the rotary cutter in which a cord replacement can be simplified when the cord is worn away, or, the rotary cutter in which the cord is replaceable without disassembling the rotary cutter itself, for example, a rotary cutter in which through-holes are formed in a part of a cylindrical body (a cord-winding part) of a reel, and the cord is inserted through the through-holes and wound onto the cylindrical body of the reel (see Japanese Utility Model Registration No. 2509199 (Unexamined Utility Model Specification 03-112218) and Japanese Patent Application Laid-Open No. 2005-124501), and a rotary cutter of in which with a cutter head portion thereof attached to a rotary driving shaft without removing a case and a cover, a cord is inserted through cord guides on both sides, and the cord is wound around a reel by rotating a pressing body (generally called "button") that rotates the reel integrally (see US 2009/0223065 A1), or the like, is suggested.

However, in the case of the conventional rotary cutter as claimed in Japanese Utility Model Registration No. 2509199 and Japanese Patent Application Laid-Open No. 2005-124501, there is an advantage that the cord is replaceable without disassembling the rotary cutter and taking out the reel. However, for example, in the case of a rotary cutter described in Japanese Utility Model Registration No. 2509199, there are some disadvantages that it is necessary to provide a cord through-hole formed between an outer circumferential surface and an inner circumferential surface of a cylindrical body of a reel (a cord-winding part) of a reel, the cord through-hole being perpendicular to an axis of rotation without providing on the inner circumferential surface, so that top and bottom positions of its cord insertion opening and a guiding hole can be on the same horizontal plane. As a result, production/processing cannot be easily carried out in order to form its cord through-hole and the guiding hole. Therefore, the production cost of such a rotary cutter can be relatively high. Furthermore, in the cases of the conventional rotary cutters described in Japanese Utility Model Registration No. 2509199 and Japanese Patent Application Laid-Open No. 2005-124501 mentioned above, there is the common disadvantage that it takes a lot of time and trouble to perform a cord insertion/conduction when the cord is wound around the reel. In addition, in the case of the rotary cutter described in US 2009/0223065 A1, as compared with the rotary cutters described in Japanese Utility Model Registration No. 2509199 and Japanese Patent Application Laid-Open No. 2005-124501 mentioned above, a cord replacement work required when the cord is worn is simpler, but there is the disadvantage that when the cord wound around the reel is consumed due to wear of the cord and only a small amount or short length of the cord is left during the cutting work, the remaining cord wound around the reel easily falls out of the reel due to centrifugal force since no means or mechanism to hold the cord is provided and therefore the cutting work cannot be continued.

The present invention has been made to eliminate the disadvantages of the conventional techniques as described above, in particular the disadvantage of the rotary cutter of the type (US 2009/0223065 A1) in which with a cutter head portion thereof attached to a rotary driving shaft without removing a case and a cover, the cord is inserted through cord guides on both sides, and the cord is wound around the reel by rotating a pressing body (generally called button) that rotates the reel integrally, and an object of the present invention is to provide a rotary cutter for a mower not only in which the cord can be wound rapidly and easily, but also in which even when the cord wound around the reel is consumed and shortened due to wear of the cord, the cutting work can be continued by preventing the cord wound around the reel from falling out of the reel.

SUMMARY OF THE INVENTION

A rotary cutter for a mower according to the present invention is a rotary cutter for a mower, including: a cord for cutting grass and the like by rotating itself; a reel for housing the cord and reeling out the cord while intermittently rotating; a case for housing the reel; a cover for covering the case; a pressing body projecting from the case, being axially movable by being pressed, and rotating the reel integrally; and a resilient element being axially mounted between the cover and the reel, and resiliently-supporting the cover and the reel mutually, wherein the reel is axially moved by rotation of the pressing body so as to come into contact with/separate from the pressing body, and the cord is wound around the reel while being inserted and clamped in a clearance created between the pressing body and the reel due to the axial movement of the reel.

In addition, according to the present invention, the rotary cutter for a mower is configured such that projections, which are provided on the case side of the reel, and sloping projections, which are provided on an inner face of the case and facing the another projections, engage with/disengage from each other, thereby restricting rotation of the reel in a cord reeling-out direction, and the mechanism of the configuration is such that by rotating the reel which rotates integrally with the pressing body in the opposite direction from the cord reeling-out direction, the cord inserted in the clearance created between the pressing body and the reel by action of the projections of the reel and the sloping projections of the case is wound around the reel while being clamped by the pressing body and the reel.

Furthermore, the rotary cutter of the present invention is configured such that, in a state that the reel is axially moved by pressing the pressing body, projections, which are provided on the cover side of the reel, and projections, which are provided on an inner face of the cover and facing the another projections, engage with each other, and thereby restricting rotation of the reel, and the mechanism of the configuration is such that when the pressing body is pressed, the projection of the reel and the sloping projection of the case disengage from each other so that the reel rotates to reel out the cord, and furthermore the projections of the reel moved axially and the projections of the cover engage with each other, and thereby stopping rotation of the reel, and when the pressing body is returned, the reel returns and the projections of the reel and the sloping projections of the case engage with each other.

Furthermore, a preferred aspect of the present invention is such that the pressing body includes a plate portion which clamps the cord and a pressing main body portion, and the plate portion is integrated with or separated from the pressing main body portion. In addition, a preferred aspect of the present invention is such that, in the plate portion of the pressing body, a contact portion with the cord has a sawtooth or wavy shape.

The rotary cutter for a mower of the present invention makes it possible to wind the cord around the reel by inserting the cord through the cord guides on both sides and rotating the pressing body (generally called "button") that rotates the reel integrally, with a cutter head portion thereof attached to a rotary driving shaft without removing the case and the cover, and consequently this rotary cutter for a mower can make winding of the cord around the reel rapid and reliable. And besides, the rotary cutter for a mower has a structure in which the cord is wound around the reel with the cord clamped by the cord clamping mechanism (cord holding mechanism) that clamps the cord in a clearance created between the pressing body and the reel due to the axial movement of the reel by rotation of the pressing body, and therefore, even if the cord wound around the reel becomes small in amount or short in length due to wear of the cord during cutting work, there is little possibility that the remaining cord wound around the reel falls out of the reel due to centrifugal force, and at a result cutting work can be continued. In addition, since a contact portion of the cord clamping mechanism with the cord has a sawtooth or wavy shape, a cord clamping force (holding force) increases, so that not only the cord can be wound around the reel stably and reliably, but also a larger effect of preventing the cord from falling out, which is sufficient to withstand centrifugal force, can be obtained. Furthermore, the rotary cutter for a mower of the present invention can be structurally easily manufactured/processed with a small number of components, and the manufacturing cost is also low.

BRIEF DESCRIPTION OF THE DRAWINGS

FIG. 5 is a vertical sectional view showing the same rotary cutter for a mower as above with the cord reeled in.

DETAILED DESCRIPTION OF THE PREFERRED EMBODIMENTS

Figure 1:
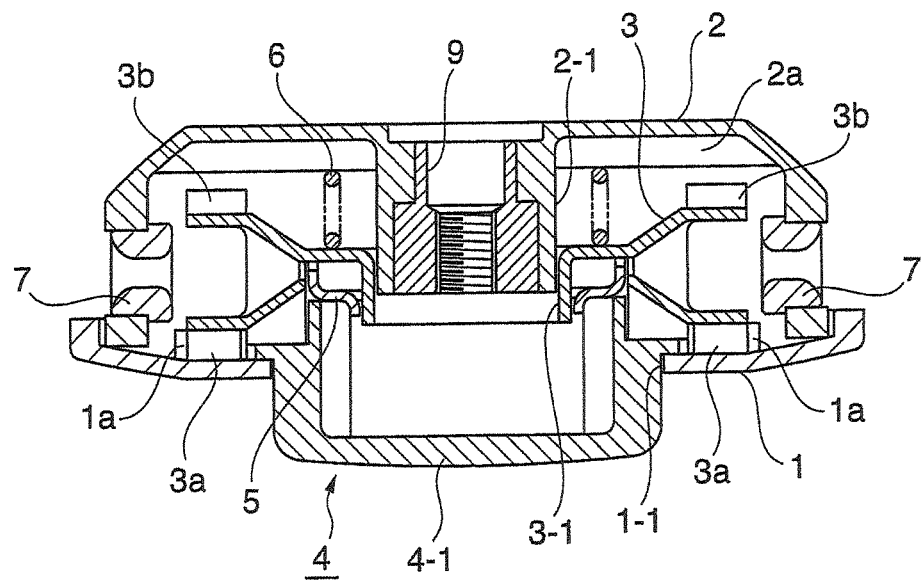
FIG. 1 is a vertical sectional view showing a rotary cutter for a mower according to an embodiment of the present invention before reeling a cord.
Figure 2:
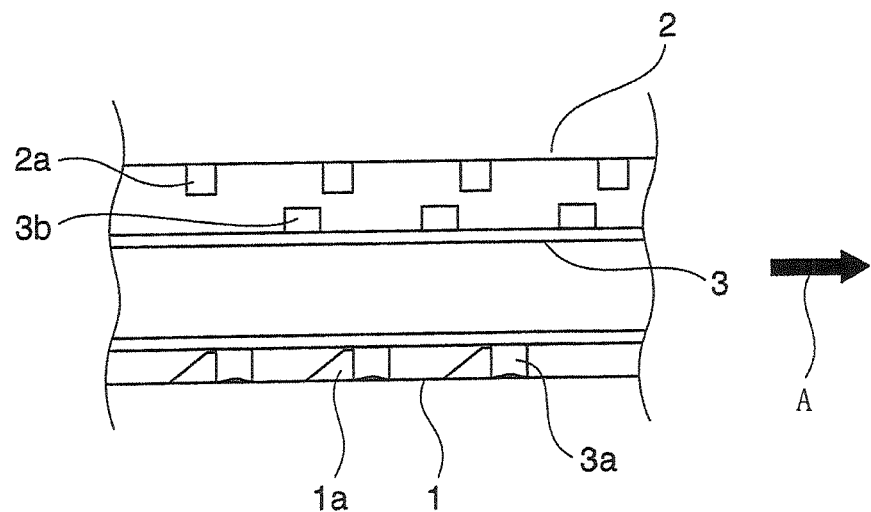
FIG. 2 is a schematic illustration showing engagement/disengagement of projections in order to describe a mechanism to restrict rotation of a reel of the rotary cutter in the state shown in FIG. 1.

A rotary cutter for a mower of an embodiment of the present invention shown in FIGS. 1 to 8 is of a type in which a cord 8 is reeled out by pushing a pressing body 4 of the rotary cutter, and the structure thereof is such that the pressing body (button) 4 formed in a cylindrical shape having a bottom and a separate reel 3 are incorporated in a central portion of a case 1 in such a way that the pressing body 4 projects downwardly of the case 1 through a through-hole 1-1 formed at the central portion of the case 1, an outer peripheral edge of the case 1 is provided with cord guides 7, a cylindrical member 2-1 which projects from the central part of an inside of a cover 2 is slidably fitted in a cylindrical portion 3-1 provided in a central portion of the reel 3, and the cover 2 and the reel 3 are resiliently and mutually supported via a spring 6 interposed between an upper face of the reel 3 and an inner face of the cover 2.

Figure 8:
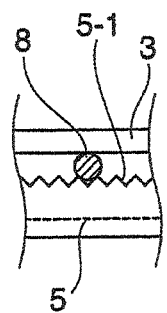
FIG. 8 is a schematic illustration showing an example of cord clamping of the same rotary cutter for a mower as above.

The pressing body (button) 4 includes a plate 5, that clamps the cord 8 by a clamping mechanism described later, and a pressing main body 4-1, and the plate 5 are separated from the pressing main body 4-1 here. In addition, though a contact portion of the plate 5 of the pressing body with the cord 8 may be in a flat state (flat), it is preferred in order to increase clamping force further that the contact portion with the cord 8, for example, has the shape of a sawtooth 5-1, as shown in FIG. 8.

Figure 3:
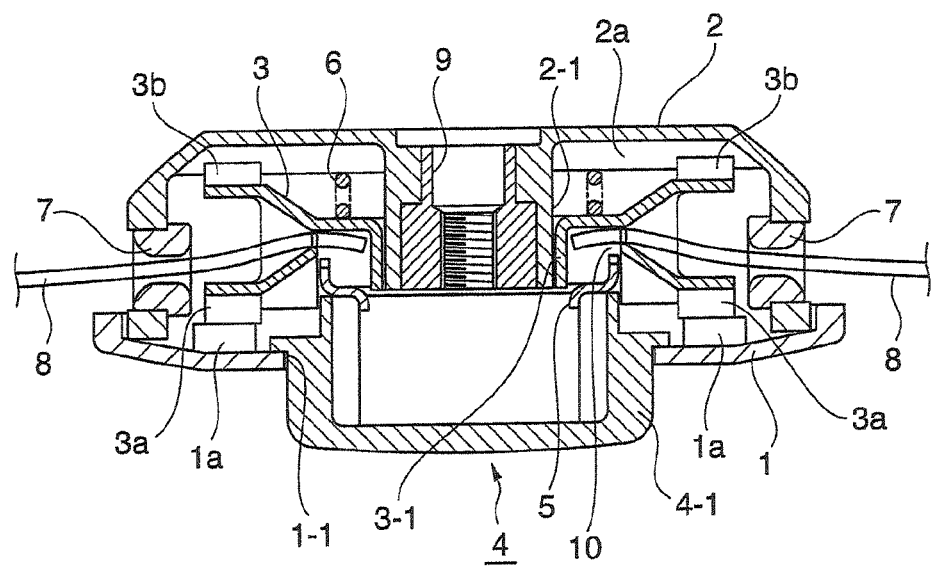
FIG. 3 is a vertical sectional view showing the same rotary cutter for a mower as above with a distal end of the cord inserted therein.

Projections to constitute a mechanism for restricting a rotational direction of the reel 3 and the cord clamping mechanism are provided between the case 1 and the reel 3. That is, the case 1 is provided with sloping projections 1a, and a lower face (the case side) of the reel 3 facing the projections 1a is provided with projections 3a, respectively, and furthermore, the inner face of the cover 2 is provided with projections 2a, and the upper face of the reel 3 facing the projections 2a is provided with projections 3b, respectively. And, when the reel 3 that rotates integrally with the pressing body (button) 4 is rotated in the opposite direction from a direction in which the cord 8 is reeled out (a direction indicated by arrow A shown in FIG. 2), the projections 3a provided on the lower face (on the case side) of the reel 3 climb on the sloping projections 1a provided on the inner face of the case 1 (FIG. 4), and according to this engagement action, the reel 3 moves in a shaft center direction against the spring 6, and then, as shown in FIG. 3, a clearance that allows insertion of a distal end of the cord 8 is created between the plate 5 integrated with the pressing body (button) 4 and the reel 3. When the pressing body (button) 4 is further rotated, the projections 3a of the reel 3 fall down the sloping projections 1a of the case 1, thereby closing the clearance, and thus the cord 8 is clamped. On the other hand, in a relation between the projections 2a of the cover 2 and the projections 3b of the reel 3, in a state that the reel 3 is axially moved by pressing the pressing body (button) 4 inward, the projections 2a of the cover 2 and the projections 3b of the reel 3 engage with each other, and thereby restricting rotation of the reel 3. That is, with the pressing body (button) 4 pressed by doing things like hitting the pressing body (button) 4 against the ground (FIG. 6), when the projections 2a of the cover 2 and the projections 3b of the reel 3 do not engage with each other (FIG. 7(a)), the reel 3 rotates in a direction indicated by arrow B, and thereby reeling out the cord 8, while when the projections 2a of the cover 2 and the projections 3b of the reel 3 engage with each other (FIG. 7(b)), the reel 3 stops rotating, and thereby stopping reeling out the cord. When the pressing body (button) 4 is put back, the reel also returns to its original position, and the sloping projections 1a of the case 1 and the projections 3a of the reel 3 engage with each other again. It should be noted that the reference numeral 9 denotes a nut member fixed to the central portion of the cover 2 in order to connect a driving rotary shaft (not shown) of a motor or the like.

Figure 4:
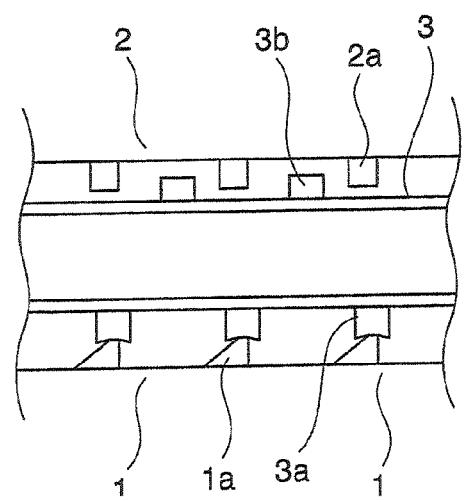
FIG. 4 is a schematic illustration showing engagement/disengagement of projections in order to describe a mechanism to restrict rotation of a reel of the rotary cutter in the state shown in FIG. 3.
Figure 5:
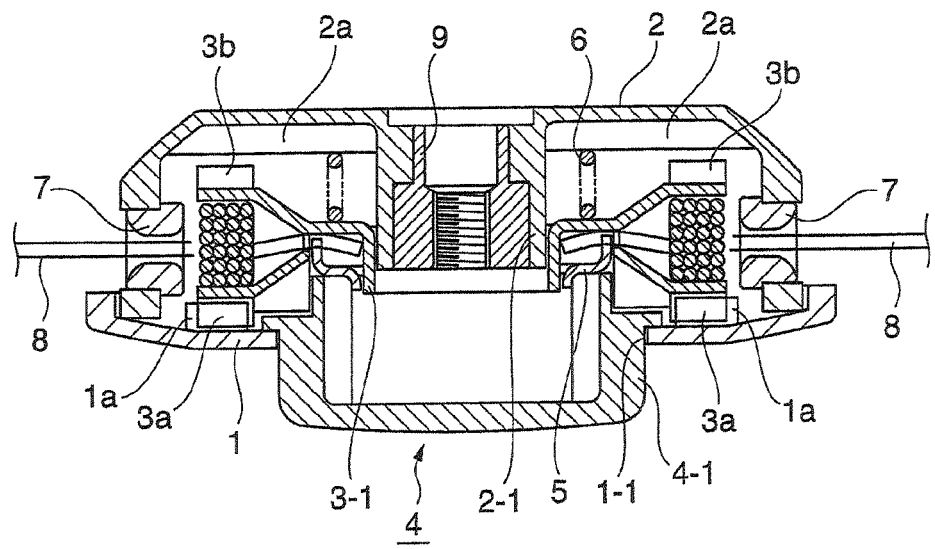

In the rotary cutter for a mower having the configuration shown in FIGS. 1 to 8, when cord replacement is performed due to wear of the cord, at first, as shown in FIGS. 3 and 4, when the reel 3 that rotates integrally with the pressing body (button) 4 is rotated in the opposite direction from a direction in which the cord 8 is reeled out in the state shown in FIG. 1, the projections 3a provided on the lower face (on the case side) of the reel 3 climb on the sloping projections 1a provided on the inner face of the case 1 (FIG. 4), and according to this engagement action, the reel 3 moves in a shaft center direction against the spring 6, and thus a clearance 10 is created between the plate 5 of the pressing body (button) 4 and the reel 3 (FIG. 3). Subsequently, by inserting a distal end of the cord 8 into the clearance 10 beyond the plate 5 and further rotating the pressing body (button) 4 in this state, the projections 3a of the reel 3 fall down the sloping projections 1a, and thereby closing the clearance 10, and simultaneously the reel 3 moves toward the case 1 due to biasing force of spring 6, thereby clamping the line 8 with the plate 5. After the distal end of the cord 8 is thus clamped by the plate 5, the cord 8 is wound around the reel 3 by further rotating the pressing body (button) 4.

Figure 6:
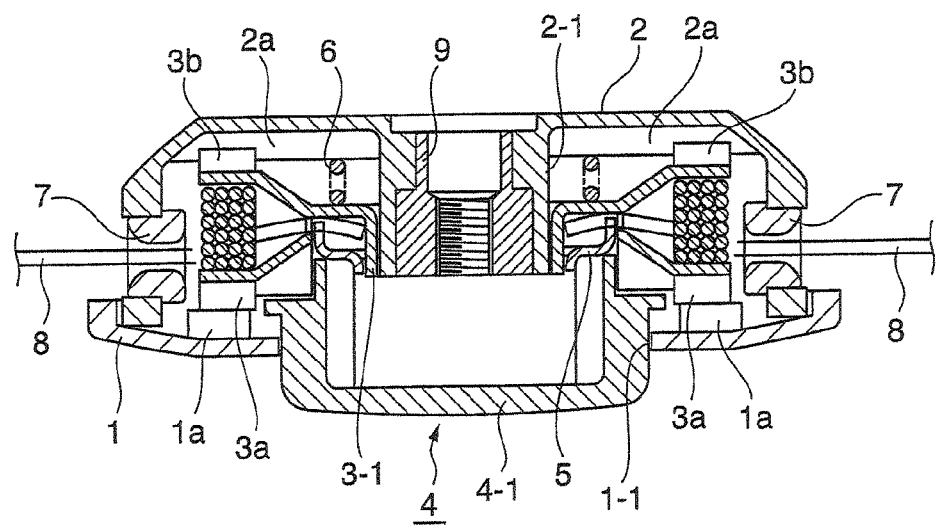
FIG. 6 is a vertical sectional view showing the state shown in FIG. 5 with a pressing body (button) pressed.
Figure 7A:
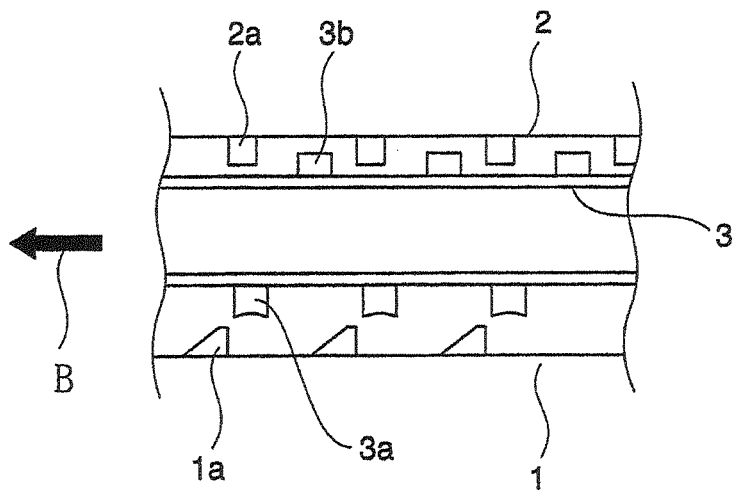
FIG. 7 is a schematic illustration showing engagement/disengagement of projections in order to describe a mechanism to restrict rotation of a reel of the rotary cutter in the state shown in FIG. 6.
Figure 7B:
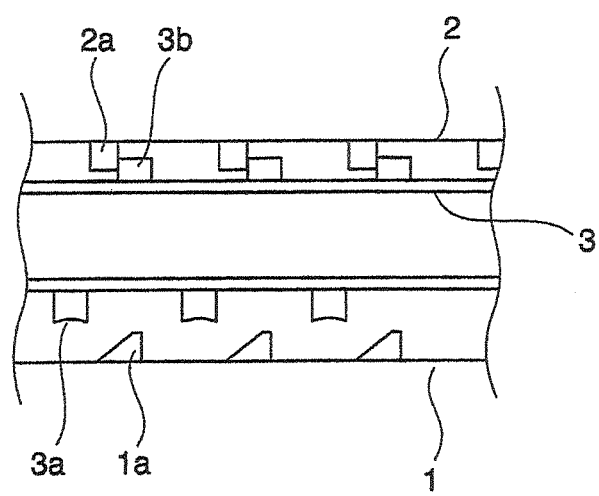

During cutting work, the projections 3a of the reel 3 and the sloping projections 1a of the case 1 are engaged together, but when the length of an exposed portion of the cord 8 from the cord guide 7 becomes short due to wear of the cord 8, by pushing the pressing body (button) 4 against the ground so as to be pressed inward as shown in FIG. 6, the engagement between the projections 3a of the reel 3 and the sloping projections 1a of the case 1 is cancelled as shown in FIG. 7(a), and then the reel 3 rotates and reels out the cord 8. After the cord 8 is reeled out, the projections 3b of the reel 3 engage with the projections 2a of the cover 2, the reel 3 temporarily stops rotating, and returns to its original position due to the force of the spring 6, the projections 3a of the reel 3 and the sloping projections 1a of the case 1 engage with each other again, and thus the reel 3 is fixed.

In addition, even if the cord wound around the reel 3 becomes small in amount or short in length, there is little possibility that the remaining cord wound around the reel 3 falls out of the reel due to centrifugal force since the cord 8 is clamped by the plate 5 due to the biasing force of the spring 6 according to the cord clamping mechanism, and therefore it is possible to keep continuing cutting work.

Regarding replacement of the cord in the rotary cutter for a mower, as described above, with a cutter head portion thereof attached to a rotary driving shaft (not shown) without removing the case 1 and the cover 2, the cord 8 can be inserted through the cord guides 7 on both sides and be wound around the reel by rotating the pressing body (button) 4 that rotates the reel integrally, and therefore winding the cord 8 around the reel 3 can be rapidly and reliably performed.

It should be noted that the plate 5 that clamps the cord 8 in the rotary cutter for a mower shown in FIGS. 1 to 8 is here shown as a separate body by way of example, but may be formed as a body integrated with the pressing main body, of course. In addition, the cord guide 7 shown here has a cylindrical shape, but is not limited to this shape, and the cord guide 7 may have a groove-like shape, of course.

The rotary cutter for a mower of the present invention makes it possible to wind the cord around the reel by inserting the cord through the cord guides on both sides and rotating the pressing body (button) that rotates the reel integrally, with a cutter head portion thereof attached to a rotary driving shaft without removing the case and the cover, and consequently this rotary cutter for a mower can make winding of the cord around the reel rapid and reliable. And besides, the rotary cutter for a mower has a structure in which the cord is wound around the reel with the cord clamped by the cord clamping mechanism (cord holding mechanism) that clamps the cord in a clearance created between the pressing body and the reel due to the axial movement of the reel by rotation of the pressing body, and therefore, even if the cord wound around the reel becomes small in amount or short in length due to wear of the cord during cutting work, there is little possibility that the remaining cord wound around the reel falls out of the reel due to centrifugal force, and as a result, cutting work can be continued. Furthermore, the rotary cutter for a mower can be structurally easily manufactured/processed with a small number of components, and the manufacturing cost is also low. Therefore, the rotary cutter for a mower of the present invention has excellent utility for a mower for grass or weeds.

The invention claimed is:

1. A rotary cutter for a mower, comprising:
a cord for cutting grass and the like by rotating itself;
a reel for housing the cord and reeling out the cord while intermittently rotating;
a case for housing the reel;
a cover for covering the case;
a pressing body projecting from the case, being axially movable by being pressed, and rotating the reel integrally; and
a resilient element being axially mounted between the cover and the reel, and resiliently-supporting the cover and the reel mutually, wherein
the reel is axially moved by rotation of the pressing body so as to come into contact with/separate from the pressing body, and the cord is wound around the reel while being inserted and clamped in a clearance created between the pressing body and the reel due to the axial movement of the reel.

2. The rotary cutter for a mower according to claim 1, wherein a configuration adopted that projections, which are provided on the case side of the reel, and sloping projections, which are provided on an inner face of the case and facing the projections, engage with/disengage from each other, thereby restricting rotation of the reel in a cord reeling-out direction, and the mechanism of the configuration is such that by rotating the reel which rotates integrally with the pressing body in the opposite direction from the cord reeling-out direction, the cord inserted in the clearance created between the pressing body and the reel by action of the projections of the reel and the sloping projections of the case is wound around the reel while being clamped by the pressing body and the reel.

3. The rotary cutter for a mower according to claim 2, wherein a configuration is adopted that, with the reel moved axially by pressing the pressing body, another projections, which are provided on the cover side of the reel, and still another projections, which are provided on an inner face of the cover and facing the another projections, engage with each other, and thereby restricting rotation of the reel, and the mechanism of the configuration is such that when the pressing body is pressed, the projections of the reel and the sloping projections of the case disengage from each other so that the reel rotates to reel out the cord, and furthermore the another projections of the reel moved axially and the still another projections of the cover engage with each other, and thereby stopping rotation of the reel, and when the pressing body is returned, the reel returns and the projections of the reel and the sloping projections of the case engage with each other.

4. The rotary cutter for a mower according to claim 3, wherein the pressing body comprises a plate portion which clamps the cord and a pressing main body portion, and the plate portion is integrated with or separated from the pressing main body portion.

5. The rotary cutter for a mower according to claim 4, wherein, in the plate portion of the pressing body, a contact portion with the cord has a sawtooth or wavy shape.

6. The rotary cutter for a mower according to claim 1, wherein a configuration is adopted that, with the reel moved axially by pressing the pressing body, another projections, which are provided on the cover side of the reel, and still another projections, which are provided on an inner face of the cover and facing the another projections, engage with each other, and thereby restricting rotation of the reel, and the mechanism of the configuration is such that when the pressing body is pressed, the projections of the reel and the sloping projections of the case disengage from each other so that the reel rotates to reel out the cord, and furthermore the another projections of the reel moved axially and the still another projections of the cover engage with each other, and thereby stopping rotation of the reel, and when the pressing body is returned, the reel returns and the projections of the reel and the sloping projections of the case engage with each other.

7. The rotary cutter for a mower according to claim 6, wherein the pressing body comprises a plate portion which clamps the cord and a pressing main body portion, and the plate portion is integrated with or separated from the pressing main body portion.

8. The rotary cutter for a mower according to claim 7, wherein, in the plate portion of the pressing body, a contact portion with the cord has a sawtooth or wavy shape.

9. The rotary cutter for a mower according to claim 1, wherein the pressing body comprises a plate portion which clamps the cord and a pressing main body portion, and the plate portion is integrated with or separated from the pressing main body portion.

10. The rotary cutter for a mower according to claim 2, wherein the pressing body comprises a plate portion which clamps the cord and a pressing main body portion, and the plate portion is integrated with or separated from the pressing main body portion.

* * * * *